United States Patent [19]
Bergquist

[11] Patent Number: 5,317,900
[45] Date of Patent: Jun. 7, 1994

[54] ULTRASENSITIVE HELIUM LEAK DETECTOR FOR LARGE SYSTEMS

[75] Inventor: Lyle E. Bergquist, Tuscon, Ariz.

[73] Assignee: The Lyle E. & Barbara L. Bergquist Trust, Tucson, Ariz.

[21] Appl. No.: 955,984

[22] Filed: Oct. 2, 1992

[51] Int. Cl.⁵ .............................................. G01M 3/20
[52] U.S. Cl. .................................................... 73/40.7
[58] Field of Search ........................................ 73/40.7

[56] References Cited

U.S. PATENT DOCUMENTS

| | | | |
|---|---|---|---|
| 4,492,110 | 1/1985 | Bergquist | 73/40.7 |
| 4,571,158 | 2/1986 | Maegdefessel | 417/51 |
| 4,608,866 | 9/1986 | Bergquist | 73/40.7 |
| 4,735,084 | 4/1988 | Fruzzetti | 73/40.7 |
| 4,773,256 | 9/1988 | Saulgeot | 73/40.7 |
| 4,776,207 | 10/1988 | Holme | 73/40.7 |
| 4,779,449 | 10/1988 | Bley et al. | 73/40.7 |
| 4,785,666 | 11/1988 | Bergquist | 73/40.7 |
| 4,919,599 | 4/1990 | Reich et al. | 73/40.7 X |
| 5,049,168 | 9/1991 | Danielson | 73/40.7 X |

FOREIGN PATENT DOCUMENTS

| | | | |
|---|---|---|---|
| 58-35434 | 3/1983 | Japan . | |
| 59-48630 | 3/1984 | Japan . | |
| 66127 | 4/1985 | Japan | 73/40.7 |
| 3-4133 | 1/1991 | Japan . | |
| 1504527 | 8/1989 | U.S.S.R. | 73/40.7 |

Primary Examiner—Tom Noland
Assistant Examiner—Joseph W. Roskos
Attorney, Agent, or Firm—Julian C. Renfro

[57] ABSTRACT

A leak detector for sensing a test gas leaking into a vacuum chamber in accordance with this invention comprises a vacuum chamber having an opening, and a momentum transfer pump connected to such opening and serving to compress the gases emanating from the vacuum chamber. An entrainment pump is connected to receive the gases exhausted from the momentum transfer pump, with the entrainment pump having means for entrapping the active exhaust gases coming from the vacuum chamber, but not the noble gases, which remain in a gaseous state and continually increase in pressure. A mass spectrometer is connected to receive the output from the entrainment pump, with the entrapment of the active exhaust gas by the entrainment pump reducing the total pressure at the mass spectrometer gas detector, thus making possible the detection and measurement by the mass detector of extremely small noble gas leaks.

17 Claims, 1 Drawing Sheet

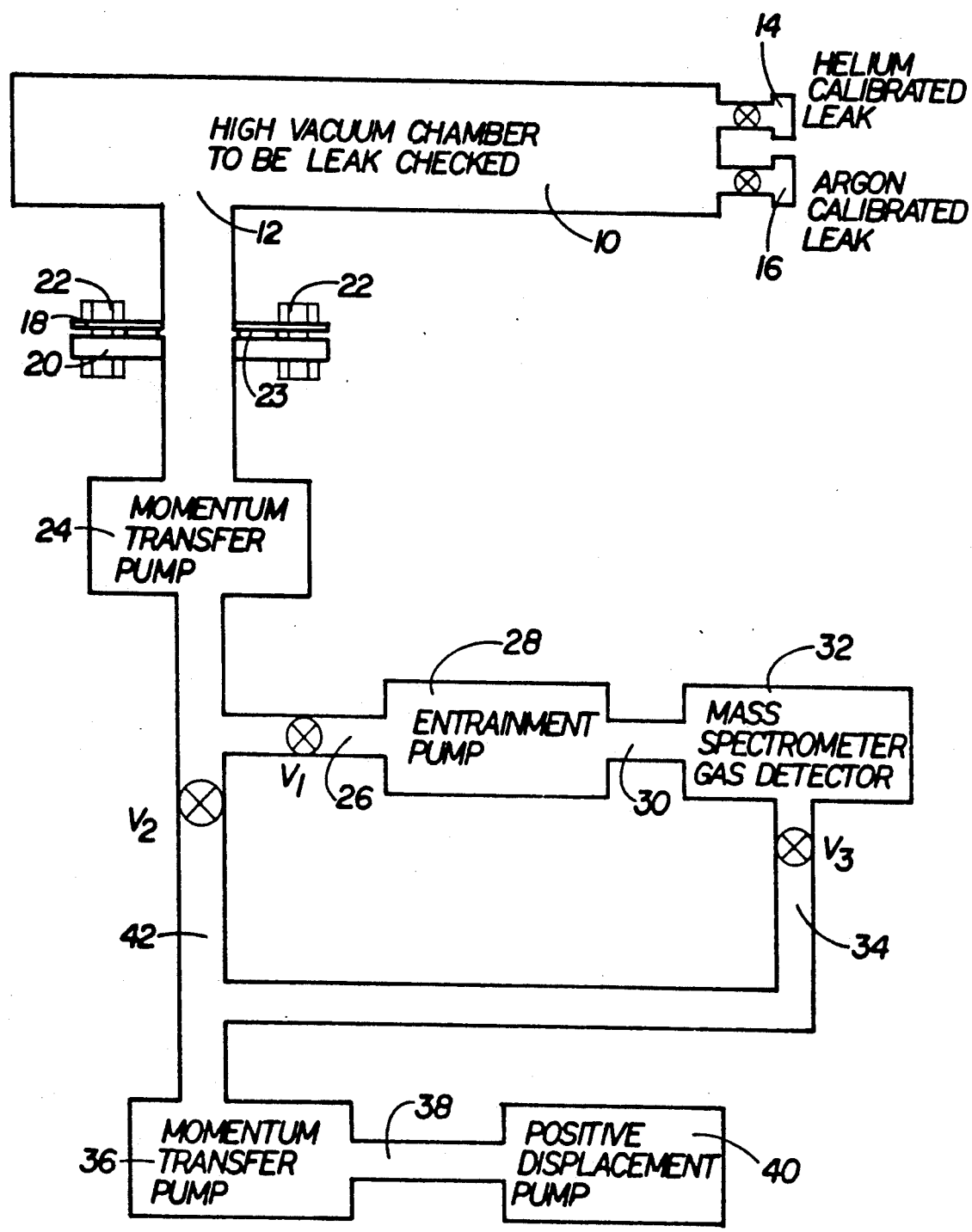

ULTRASENSITIVE HELIUM LEAK DETECTOR FOR LARGE SYSTEMS

FIELD OF THE INVENTION

This invention relates to a noble gas leak detector usable with helium or argon for ascertaining the presence of very small leaks in an ultrahigh or high vacuum chamber, also for leak checking components or devices placed in the chamber for testing.

BACKGROUND OF THE INVENTION

Noble gas leak detectors for detecting infinitesimally small leaks by means of inert noble tracer gases such as helium, argon, neon and the like, preferably helium, are known. One such detector is shown in U.S. Pat. Nos. 3,070,992 and 3,227,872. The leak detector disclosed in those patents has a mechanical pump and a diffusion pump to evacuate the system, a pressure gauge tube, a mass spectrometer to detect gaseous material and a getter pump to remove active gases during the leak checking process.

The leak detector of those patents uses a titanium sublimation getter pump to remove the active gases and to hopefully leave the noble gases for leak detection. However, helium may be entrapped under the titanium that is sublimed off of a filament, which allows helium later to evolve slowly. That slow evolution of helium causes undesirable helium background and false signals.

Other aspects of these devices also contribute to an unwanted helium background with the result that these devices could only repeatedly detect leaks larger than, $10^{-12}$ atm cc/sec at 20° C.

Other helium leak detectors use diffusion pumps that exhaust the gas from the diffusion pump into a mechanical pump. This gas then goes to the atmosphere. A liquid nitrogen cold trap is placed above the diffusion pump to capture oil molecules backstreaming from the diffusion pump and to also capture water vapor. A turbomolecular pump is sometimes used to replace the diffusion pump and liquid nitrogen trap. An inlet system on the other side of the mass spectrometer chamber allows gases to enter from the device under test. The inlet system contains a series of valves and usually another mechanical pump for initial evacuation of the gases in the device under test along with the inlet system.

Bergquist U.S. Pat. No. 4,492,110 entitled "Ultra Sensitive Noble Gas Leak Detector" uses a non-evaporable getter pump in the vacuum system that contains the mass spectrometer. During the leak test period no gases are exhausted. Active gases are captured by the getter pump, noble gases are not. The noble gases remain in a gaseous state and if helium enters the system through a leak in the component, the helium pressure increases. The helium pressure increases as long as helium surrounds the leak. This increase is detected and measured by the mass spectrometer, which detects leak rates as small as $10^{-16}$ torr liter/sec at 20° C. However, the partial pressure of the noble gas remains uniform throughout the vacuum system. If the system has a very large volume, the partial pressure of the tracer gas will be too low to be detected even after a long period of accumulation.

Bergquist U.S. Pat. No. 4,608,866 entitled "Small Component Helium Leak Detector" uses a modified cryopump which entraps all gases except helium on its cooled surfaces. Helium remains in a gaseous state inside the vacuum chamber. This system entraps the gases entering from the inlet, not the exhaust side of the turbomolecular pump. Also, as with U.S. Pat. No. 4,492,110, there is no mechanism to increase the pressure of the tracer gas.

Bergquist U.S. Pat. No. 4,785,666 entitled "Method of Increasing the Sensitivity of Leak Detector in the Probe Mode" uses a modified cryopump, but again on the inlet side and without a tracer gas enricher.

The difference between Bergquist U.S. Pat. No. 4,608,866 and U.S. Pat. No. 4,785,666 is the approach used to introduce the gases into the cryopump. In U.S. Pat. No. 4,608,866 the gas comes in and out of a baffled flange at the top of the cryopump. Not all gases that are on top of the pump immediately enter the pump. Some of the gases may also come out of the cryopump before they enter the cold region and are frozen. U.S. Pat. No. 4,785,666 has the inlet gases going in on the bottom side of the cryopump where most of the gases are entrapped except helium which goes out on the top side of the pump to the leak detector to be measured.

Japanese U.S. Pat. No. 59-48630 aims at preventing the backstreaming of atmospheric helium to the detector region. It uses a sorption pump and a "helium reservoir" instead of a mechanical exhaust pump during the test cycle. This may eliminate the back diffusion of helium from the atmosphere and through the mechanical exhaust pump. However, the partial pressure of helium at the sensor head remains very low. The detector senses helium as it flows by the sensor head on its way to the "helium reservoir" and the sorption pump.

Japanese U.S. Pat. No. 58-35434 measures the helium pressure at the mid point of a turbomolecular pump, but does not allow the helium to accumulate nor does it preferentially pump active gases to lower the total pressure. The total pressure in the vacuum chamber must be approximately $10^{-10}$ torr before making the test, therefore leak testing is limited to extremely low chamber pressures.

None of these prior art devices uses an entrainment pump placed on the exhaust side of a turbomolecular pump, removing the active gases and collecting the noble gases, thus reducing the active gases to low enough pressure that a mass spectrometer can be operated to measure the noble gases accumulated in or around the entrainment pump.

SUMMARY OF THE INVENTION

Until recently scientific and industrial programs have not required the level of sensitivity in leak detection for very large chambers that the instant invention offers. Now, new high technology industry is seeking the benefits which only this invention provides. A project of major scientific significance, which is currently under development, incorporates an ultrahigh vacuum chamber of 9,000 cubic meters for which the desired total in-leakage rate for helium is $7.6 \times 10^{-11}$ torr liter/sec. Such rigorous leak tight requirements have not previously been placed on such large vacuum chambers. Recent advancements in technology and consequently more stringent specifications demand increased sensitivity in leak detection. The instant invention is the first and only detector to meet such requirements.

Leak detector manufacturers have been concentrating on the inlet system, packaging, and microelectronics to control the leak detection process. Very little work has been done on the normal helium leak detector to increase the sensitivity beyond $1 \times 10^{-10}$ torr liter/sec. With the typical prior art helium leak detector attached to a vacuum system, the overall system sensitivity is much poorer than the manufacturer's specification. The system sensitivity greatly depends upon how the detector is connected to a vacuum system, and it is obvious that the manufacturer has no control over the way their leak detector is utilized in industry.

The highly advantageous leak detector defined herein is an integral part of the vacuum system for the system under test. Under consideration is the system sensitivity, not just the sensitivity of the leak detector. A clean momentum transfer type pump with a high compression ratio, such as the magnetic turbomolecular pump, which may serve as the principal pump for continuously evacuating the system, is an integral part of this novel helium leak detector. Another pump, an entrainment pump that preferentially pumps active gases, is used specifically to increase the system sensitivity for a large system. Surfaces, valves and seals of all metal composition are used wherever there is gaseous contact, in order to reduce permeation into the leak detector system. The designated components associated with this invention, the momentum transfer pump; all metal surfaces, valves and seals; preferential entrainment pump; sensitive mass spectrometer, serve to enhance the sensitivity of this leak detector. Some of the preferred components have become available only within the last two or three years. Therefore, it has not been previously obvious to those skilled in the art that such a level of sensitivity could be achieved by the highly effective combination of such components into the novel configuration I utilize.

It is important to note that the instant invention is an integral system approach to increasing leak detection sensitivity for new applications whose specifications exceed the limits of other leak detectors. The emphasis is on a system, not merely a leak detector that is usually considered to be an instrument that is easily attached to a vacuum system. Thus, this invention constitutes a highly advantageous leak detector which is an integral part of a vacuum system, which must be a part of a system in order to function. To date, no other leak detector involves this requirement.

Those skilled in this art are aware of the fact that pumping requirements for ultrahigh vacuum systems can be greatly reduced if real leaks are small or non-existing. Real leaks need to be less than $10^{-10}$ torr liter/sec at 20° C. for the number of pumps to be reduced and still maintain a total pressure of less than $10^{-10}$ torr. It is thus to be seen that the present invention involves a novel arrangement for leak checking high vacuum and ultrahigh vacuum chambers where the leaks to be found may be smaller than $10^{-11}$ torr liter/sec at 20° C. This procedure increases the sensitivity of the leak checking system by several decades over that of customary practice.

Helium may be used for leak checking, and the sensitivity for helium in this system is increased by the use of a momentum transfer pump, since it compresses all species of gases in the chamber and exhausts these gases into an entrainment pump. The entrainment pump I utilize serves to entrap all but the noble gases. The helium level in the entrainment pump continues to increase as long as helium is evacuated from the vacuum chamber to be leak checked.

A substantial advantage of my new leak checking system is that the helium (or any other noble gas used as tracer) exhausted from the chamber then remains in the entrainment pump and mass spectrometer, thereby greatly increasing helium pressure such that low levels of helium in the chamber can be easily measured by the use of a mass spectrometer. As will be seen hereinafter, the latter device can be a quadrupole or a magnetic sector type of mass spectrometer.

I have found that the detection of small quantities of helium entering an ultrahigh vacuum chamber is preferably accomplished by using a magnetic turbomolecular pump, for it has no hydrocarbon pumping fluid, and adds only a minimum amount of contaminating gases to the system. The pressure of the noble gases, and especially helium, is increased sufficiently to permit the detection of extremely small helium leaks.

Quite significantly, in accordance with this invention I place the mass spectrometer on the exhaust side of the turbomolecular pump and collect the noble gas over a period of time. This is detected by the mass spectrometer and its output, called ion current or signal, increases linearly under steady state conditions. That is when the quantity of helium or argon gas entering the vacuum chamber equals the quantity of the same gas being exhausted. Importantly, the entrainment pump removes the active gases from the exhaust, making the pressure low enough at the mass spectrometer side so that the mass spectrometer will be operable.

It is thus a principal object of my invention to provide a highly advantageous arrangement for leak checking an ultrahigh vacuum chamber where leaks to be found are much smaller than $10^{-11}$ torr liter/sec at 20° C.

It is another object of my invention to provide an arrangement for removing the active gases without entrapping the noble gases, which build up in pressure in an entrainment pump and in the housing containing a mass spectrometer, with the pressure of these noble gases increasing during every second of operation, meaning that the level of noble gases becomes easily detectable, and the leak rate easily determined.

It is still another object of my invention to provide a significantly effective arrangement by which helium evacuated from a vacuum chamber under test is compressed by a momentum transfer pump and then exhausted into an entrainment pump and mass spectrometer, with the entrainment pump removing the active gases from the exhaust, such that helium pressure is greatly increased, thus making possible the detection of extremely low levels of helium exhausted from the vacuum chamber.

It is yet another object of my invention to provide a method of leak checking that is not limited to ultrahigh vacuum systems.

It is yet still another object of my invention to provide faster response time and greater sensitivity than other methods of leak detection, making it useful also for high vacuum systems and component leak checking.

It is still another object of my invention to provide an arrangement whereby calibration of the leak detection system can be easily performed.

These and other objects, features and advantages will become apparent as the description proceeds.

DETAILED DESCRIPTION

With reference now to the single figure of drawing, it will be seen that I have shown a high vacuum chamber 10 that is to be leak checked. As will be readily understood by those skilled in this art, before leak checking of the vacuum chamber proceeds, the leak detector system must be calibrated in order that meaningful results will be obtained. To this end, standard calibration leaks containing helium or argon, as required by the particular test involved, are connected to the vacuum chamber by appropriate valved openings located at the end of the chamber opposite the principal opening 12.

Depending upon which gas is to be used in a given instance, either helium or argon tracer gas flows through the respective valve opening 14 or 16 into the chamber 10, where it is compressed by the momentum transfer pump 24, and stored in the entrainment pump 28, where the active gases are removed. The specific tracer gas is detected and measured by the mass spectrometer 32. The rate is correlated with the leak rate of the calibrated leak, thus assuring that the system is now calibrated for that specific gas.

It is to be noted from the figure of drawing that the principal opening 12 of the chamber 10 is equipped with a suitable flange 18, with which an all metal gasket 23 is used. Other flanges with metallic gaskets may be used throughout the system, or connections may be welded. Secured to the flange 18 of the opening 12 is the flange 20 of the momentum transfer pump 24, with these flanges being held together in a leak-tight manner by a series of bolts 22. As is obvious, when the metal gasket 23 is properly aligned between the flanges 18 and 20, and the bolts are properly tightened, a leak-free joint is created.

The momentum transfer pump 24 is preferably a magnetic turbomolecular pump, although another pump may be substituted if appropriate. Other pumps that may be considered for utilization as the momentum transfer pump are a standard turbomolecular pump; a molecular drag pump; or a diffusion pump.

The momentum transfer pump 24 is in turn connected to entrainment pump 28 via a duct 26. A valve V1 is utilized in duct 26 for enabling the operator to control the flow therethrough, as will be explained in further detail hereinafter. The momentum transfer pump 24 serves to exhaust gas from chamber 10 and to deliver it to the entrainment pump 28 that removes the active gases and leaves the noble gases.

Although momentum transfer pumps such as turbomolecular pumps and diffusion pumps have been used with vacuum systems for many years, the magnetic turbomolecular pump is relatively new. Pumps of this type employ a magnetic field as a bearing medium rather than physical contact, as is involved in the use of roller or ball bearings, thus eliminating the need for lubricant oil, grease, paste or powder.

Although more than one type of momentum transfer pump may thus be utilized in accordance with this invention, I prefer the magnetic turbomolecular pump inasmuch as it evacuates gases from the large chamber 10 utilizing no hydrocarbon pumping fluid, and adds only a minimum amount of contaminating gases to the system. Several manufacturers in the world market a magnetic turbomolecular type of momentum transfer pump.

Momentum transfer pumps have unique compression ratios for each gas. Compression ratio is determined by dividing the pressure on the exhaust side of the pump by the input pressure.

The compression rate for helium is 10,000 to 1,000,000. Each pump manufacturer has different specifications, therefore a distinct compression ratio. The pressure on the exhaust side increases linearly with the pressure on the inlet side. Because the pressure at the exhaust side of the pump increases by the factor of the compression ratio, the arrangement of components I use provides a greatly increased ability to measure a trace gas.

As will now be clear, the gases from chamber 10 are exhausted by pump 24 into the entrainment pump 28, and when, for example, helium is being used, the helium level in the pump 28 continues to increase as long as helium is being evacuated from chamber 10. As is obvious, the leakage could be taking place through the sidewall of the chamber 10, or it could be taking place from a component or device placed inside the tank, such as a battery, microelectronic device or a compressor that for leak checking purposes had been placed in the tank.

The entrainment pump 28 is in turn connected by duct 30 to mass spectrometer gas detector 32, which is a leak checker that measures the rate at which helium enters the system. The detector 32 may be either a quadrupole or a magnetic sector mass spectrometer, and this device, as well as the other mentioned components will be discussed at greater length hereinafter.

As will also be noted from the figure of drawing, a duct 34 serves to connect the mass spectrometer leak checker 32 with a momentum transfer pump 36, with a valve V3 being utilized for controlling the flow through duct 34. The momentum transfer pump 36 (turbomolecular pump is the preferred type) is in turn connected via duct 38 with the positive displacement pump 40. The pumps 36 and 40 are used during the startup phase, as well as during the evacuation of the chamber 10, as will be explained hereinafter.

An additional duct 42 is utilized to form a passage that interconnects the momentum transfer pump 24, the duct 26 leading to the entrainment pump 28, the duct 30 leading to the mass spectrometer 32, and the momentum transfer pump 36. It will be noted that valve V2 is utilized in the duct 42 to control the flow between the two momentum transfer pumps.

With regard now to the details of the entrainment pump 28, this can be a non-evaporable getter pump, a modified cryopump, or a nitrogen-cooled charcoal trap or a nitrogen cooled zeolite pump. The preferred entrainment pump is the solid state non-evaporable getter pump that removes all gases except the noble gases. The exhaust operating pressure from the getter pump 28 can be as low as $10^{-8}$ torr.

An entrainment pump, sometimes called "capture pump," is a generic word for types of pumps that do not exhaust gases but in some manner hold the gases. Description of some types of entrainment pumps follows:

With the non-evaporable getter pumps, a type of entrainment pump, active gases combine with the surfaces to make some kind of a metallic compound. Hydrogen is an exception. It goes into solution with the metal and when heated to high enough temperature, the hydrogen escapes from the metal. In the heating process, the active gases go more deeply into the metal, leaving the surface ready to combine with other active gases at a later time.

Pelletized getter pump is a form of non-evaporable getter pump. It is usually put into a cylinder that has fine meshed screen on the inlet and outlet flanges. The cylinder is usually heated by an external heater.

Another form of non-evaporable getter pump is the cartridge form, which somewhat resembles an oil filter with the getter material bonded to a metallic surface. It is put into a vacuum system and activated by heating, after which the temperature is reduced to an operating temperature.

Either getter pump can be used, but the molecular surface contact is much greater with the pelletized getter pump.

The cryopump type of entrainment pump uses cold surfaces to entrap gases. They freeze the gas into a solid state condition like frozen nitrogen. If a cryopump is operated at 15 to 20° Kelvin, nitrogen is frozen, but helium remains in a gaseous state. Argon is frozen on the cold surfaces so argon cannot be used as a tracer gas for leak detecting with this pump.

Sorption type of entrainment pumps use either charcoal or zeolite as sorption material. These materials are contained in a vessel attached to a vacuum system and then cooled with liquid nitrogen, or if desired the liquid nitrogen can be pumped on to reduce its temperature. However, the ultimate pressure is only about $10^{-6}$ torr.

Certainly the pelletized getter pump is first choice, with cartridge getter pump second choice. If the use of argon as a tracer is not desired, then the modified cryopump is useful.

Alternatively, a modified cryopump can be used for the entrainment pump 28. However, this pump entraps a minuscule percentage of the helium. An unmodified cryopump can be used with the momentum transfer pump 24 to capture the exhaust, thereby creating an ultrahigh vacuum pumping system which captures all the gases. These gases remain at a very low pressure, making an excellent pumping system for the removal of both helium and hydrogen when connected to a magnetic turbomolecular pump 24. This can be used where ultrahigh vacuum pumping systems are needed.

Another entrainment pump which can be used instead of the non-evaporable getter pump is a charcoal trap cooled by nitrogen, where the liquid nitrogen is cooled to a frozen state by pumping on the liquid nitrogen that is in the dewar. The principal advantage is the ease of restoration of the entrainment pump when filled with gases. The disadvantage is that hydrogen may not be easily pumped and a little helium is entrapped in the charcoal.

Helium is the most common gas used in leak checking vacuum systems, and when helium rather than, say, argon is being used, I employ a specific mass spectrometer 32, also referred to as a helium leak detector. The mass spectrometer is tuned to detect helium ions. Helium is either sprayed over the surface of the vacuum system or if a total measurement of helium in leakage is needed, the vacuum system can be bagged with a sealed plastic bag. The bag is then pressurized with helium. Helium enters the small holes in the vacuum system. The rate the helium enters is detected by the mass spectrometer 32. The helium ion current (called signal) is related to the size of the leak or leaks.

Two types of mass spectrometers may be used in accordance with this invention. One is a magnetic sector mass spectrometer, and the other one is a quadrupole. The mass spectrometer is made up of three distinct parts. One is the ionizer, then the analyzer and then the ion detector. The magnetic sector uses an electromagnetic field to accelerate the ions so only the desired ions are detected at the detector. The other undesired ions hit surfaces and are neutralized.

The quadrupole uses four rods, which have rf-dc voltages on them. The desired ion goes down the center between the rods and is detected by a detector. The undesired ions are neutralized on the rods. The quadrupole has several advantages, one being that a wide range of gas species other than helium are easily detected. One example is the use of argon in detecting leaks. Another advantage of the quadrupole is that an electron multiplier can be used to multiply the signal. The multiplier has a significant gain which greatly increases the sensitivity of the quadrupole.

The natural abundance of helium in the atmosphere is about 5 parts per million, so its background in vacuum systems is low. Helium is an inert or noble gas that will not form compounds with other gases. Helium is next to the smallest molecule so will go through smaller holes rapidly.

Argon is another useful noble gas. Its abundance in the atmosphere is about 0.9%. It is a heavier molecule so it travels more slowly and will not go through as small a hole. However, because of its greater natural abundance, it can be used to determine if there are large leaks in the chamber. Leak rates of $10^{-6}$ torr liter/sec to $10^{-7}$ torr liter/sec are easily determined. Then helium can be sprayed over the area to find the exact location.

For ultimate sensitivity, helium is the gas that should be used, but argon can be used as a tracer gas to indicate the general leak tightness of a vacuum chamber. Therefore, it is useful as a preliminary step in leak checking. Leaks of $10^{-6}$ to $10^{-7}$ torr liter/sec can be indicated because argon in the atmospheric air is about 0.9% of the total air. Argon from the atmosphere entering the chamber with this size of a leak is easily measured by this method. Later the mass spectrometer is tuned to detect helium. Helium is then sprayed over the surface of the chamber to locate the leak.

The mass spectrometer for the leak detector must be operated under a high vacuum, with $10^{-4}$ torr being the maximum tolerable pressure. Several approaches and methods are used to achieve these pressures in a helium leak detector.

With regard to the operation of my device, it has been previously explained that the high vacuum chamber 10 is being leak checked, which chamber is connected to a momentum transfer pump 24, with valve V1 being located between the exhaust from the momentum transfer pump and the entrainment pump 28. It has been explained that the entrainment pump may be one of several different types of entrainment pumps, but I prefer to use the pelletized non-evaporable getter pump.

It will be recalled that I utilize a valve V2 between the exhaust from the momentum transfer pump 24 and the second momentum transfer pump 36. The gas detector 32, as previously mentioned, may be a quadrupole mass spectrometer used to detect the helium or argon gases, and this quadrupole may be regarded as being operatively disposed between the entrainment pump 28 and the second momentum transfer pump 36.

The operational sequence involves an initial closure of valves V2 and V1, whereas valve V3 is open. The momentum transfer pump 36 and the positive displacement pump 40 are started, which function to exhaust the gases from the entrainment pump 28 and the quadrupole 32 through the duct or passageway 34. When the pressure is about $10^{-6}$ torr, the entrainment pump 28 is activated, if it is a non-evaporable getter pump, by heating it to about 400° C. for 30 minutes. This temperature releases the hydrogen gas held in solution and drives the other gases more deeply into the getter pump. This leaves the surface area available to react with the active gases that will later be entrapped. After activation, the temperature in the getter pump 28 is reduced to about 200° C.

Valve V1 remains closed, but valve V3 is now closed, and the momentum transfer pump 36 is stopped. Then valve V2 is opened and the chamber under test is evacuated first by the positive displacement pump 40, then momentum transfer pumps 36 and 24.

When the pressure is below $10^{-5}$ torr, the leak test can be started by closing V2 and opening V1, with the valve V3 remaining closed. Advantageously, the momentum transfer pump 24 now compresses the gases coming from the chamber 10 and exhausts all these gases into the entrainment pump 28. The entrainment pump removes the active gases but does not entrap the noble gases, which build up in pressure in the entrainment pump and in the housing containing the mass spectrometer 32. It is to be noted that during every second of operation, the pressure of these noble gases increases, which means that the level is easily detected and the leak rate easily determined. The leak rate is of course relatable to the size of the hole through which the leakage is taking place.

It is thus to be seen that my novel technique greatly enhances the sensitivity of the system, and its ability to detect small leaks, by allowing the pressure of the noble gases to continuously increase in the entrainment pump and in the housing containing the mass spectrometer 32.

The quadrupole type of mass spectrometer 32 may initially be tuned to argon to determine if large leaks exist in the chamber 10 being leak checked. If so, helium is sprayed over the surface while the quadrupole 32 is tuned to helium to find the leak. If no large leaks, the system is then bagged and helium is used to pressurize the bag. If there is a leak, the helium signal as detected by the quadrupole will rise.

When the test is complete, valve V1 is closed and valve V3 is opened. At this point the helium is exhausted by the operation of the pumps 24, 36 and 40. Then V3 is closed.

It is therefore to be seen that I have provided a highly advantageous leak detector unlike the devices of the prior art in that it becomes an integral part of the vacuum system for the system under test, which makes possible the leak checking of a large ultrahigh vacuum chamber or components placed in the chamber where leaks to be found can be smaller than $10^{-11}$ torr liter/sec at 20° C.

I claim:

1. A leak detector for sensing a test gas leaking into a vacuum chamber comprising
   a vacuum chamber having an opening,
   a momentum transfer pump having means to compress the gases coming from the vacuum chamber, connected to said opening of said vacuum chamber,
   an entrainment pump connected to receive the gases exhausted from said momentum transfer pump, said entrainment pump having means for entrapping the active exhaust gases coming from the vacuum chamber, but not the noble gases, which remain in a gaseous state,
   a mass spectrometer connected to receive the output from said entrainment pump,
   the entrapment of the active exhaust gas by said entrainment pump reducing the total pressure at said mass and measurement by said mass detector of extremely small amounts of the noble gas, and
   a second momentum transfer pump for evacuating gases after the noble gases have accumulated, and a positive displacement pump for exhausting the gases to the atmosphere from said second momentum transfer pump.

2. The leak detector as recited in claim 1 in which the noble gas is helium.

3. The leak detector as recited in claim 1 in which the noble gas is argon.

4. The leak detector as recited in claim 1 wherein said momentum transfer pump used to compress the gas from the vacuum chamber is a magnetic turbomolecular pump, and said second momentum transfer pump is a standard turbomolecular pump.

5. The leak detector as recited in claim 1 wherein said momentum transfer pumps are standard turbomolecular pump.

6. The leak detector as recited in claim 1 wherein said momentum transfer pumps are a molecular drag pump.

7. The leak detector as recited in claim 1 wherein said momentum transfer pumps are a diffusion pump.

8. The leak detector as recited in claim 1 wherein said entrainment pump is a pelletized getter pump.

9. The leak detector as recited in claim 1 wherein said entrainment pump is of the cartridge type of getter.

10. The leak detector as recited in claim 1 wherein said entrainment pump is of the cryopump type.

11. The leak detector as recited in claim 1 wherein said entrainment pump is of the sorption type.

12. The leak detector as recited in claim 1 wherein said mass spectrometer is a quadrupole.

13. The leak detector as recited in claim 1 wherein said mass spectrometer is of the magnetic sector type.

14. A leak detector as recited in claim 1 for sensing a test gas leaking from a device contained in said vacuum chamber.

15. A process for sensing a noble gas leaking into a vacuum chamber comprising the steps of:
   providing a vacuum chamber having an opening,
   connecting a momentum transfer pump to said opening of said vacuum chamber,
   connecting an entrainment pump to receive the exhaust gases from said momentum transfer pump, said entrainment pump entrapping the active exhaust gases coming from the vacuum chamber, but not a noble gas, which remains in a gaseous state, and
   connecting a mass spectrometer to receive the output from said entrainment pump,
   the entrapment of the active exhaust gases by said entrainment pump reducing the pressure at said mass spectrometer detector, thus making possible the detection and measurement by said mass spectrometer gas detector of extremely small amounts of the noble gas, and connecting a momentum transfer pump and positive displacement pump by means of a duct in which a valve is located, whereby the noble gases and residual gases can be evacuated before continuing with subsequent tests.

16. The process for sensing a noble gas leaking into a vacuum chamber as recited in claim 15 wherein the entrainment pump connected on the exhaust side of the momentum transfer pump removes active gases, collecting and containing noble gases, and measuring the level of these noble gases continuously during leak checking, said process further involving the rapid evacuation of the exhaust gases when the leak test is complete, such that another test can be started without first pressurizing the chamber.

17. The process for sensing a noble gas leaking into a vacuum chamber as recited in claim 15 wherein said momentum transfer pump serves to increase the concentration of noble gases that leak into a high vacuum chamber by the steps of collecting, compressing and containing those noble gases in a reduced volume consisting of conduits, valves, entrainment pump and a housing containing said mass spectrometer.

* * * * *